Nov. 27, 1951  W. P. DALRYMPLE  2,576,578
VALVE MECHANISM
Filed July 19, 1946
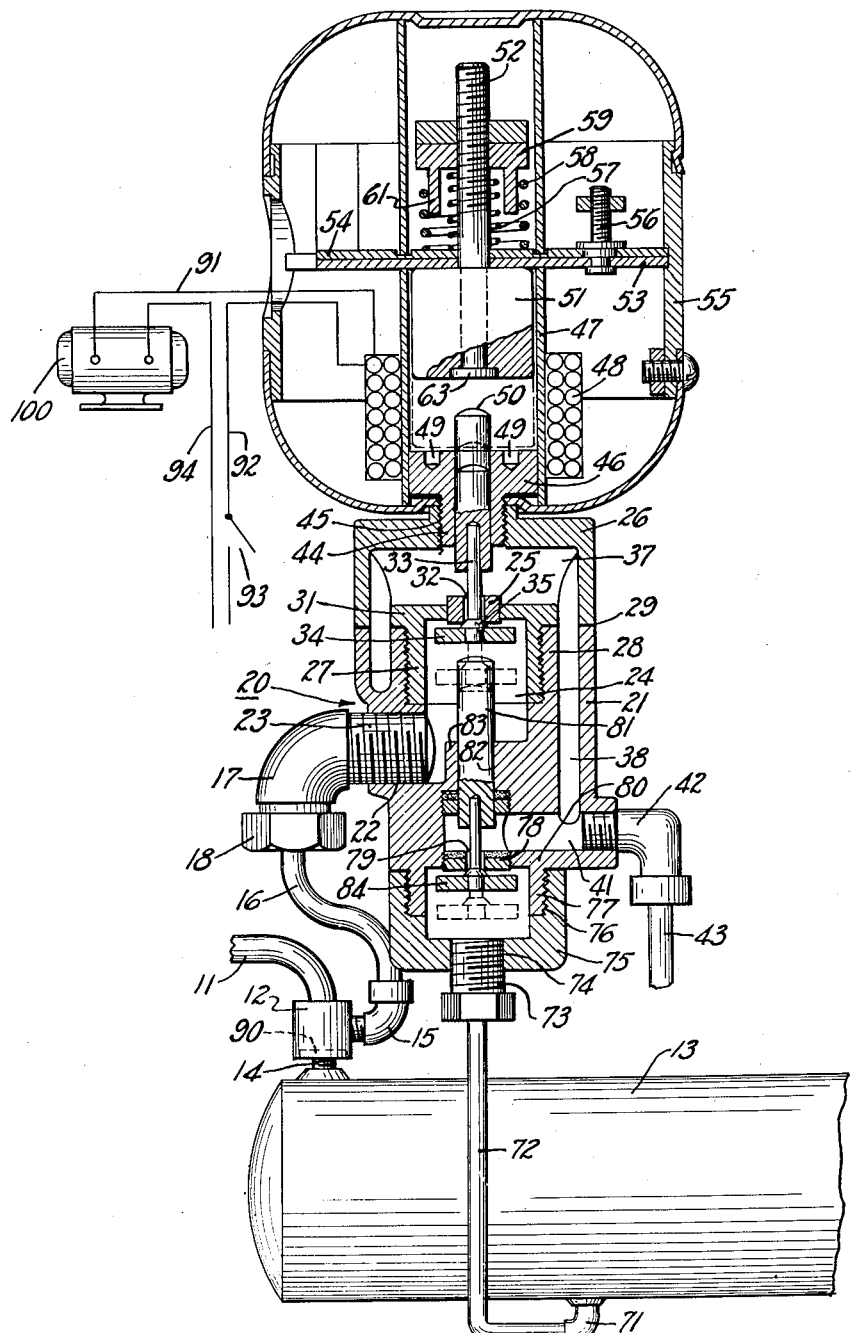
INVENTOR
WILLIAM P. DALRYMPLE
BY Wallace and Cannon
ATTORNEYS Patented Nov. 27, 1951

2,576,578

UNITED STATES PATENT OFFICE 2,576,578

VALVE MECHANISM

William P. Dalrymple, Rochester, N. Y., assignor to American Brake Shoe Company, New York, N. Y., a corporation of Delaware Application July 19, 1946, Serial No. 684,730

9 Claims. (Cl. 230—24)

1

This invention relates to valve mechanism and particularly to magnetically operated valve mechanism for unloading a fluid compressor or the like, particularly during operations of starting said compressor.

Fluid pumps and compressors, for example, air compressors, are commonly driven by electric motors of various types such as induction motors, repulsion motors, and repulsion-induction motors using alternating current. Most of these motors either have a relatively low starting torque, or they are provided with special starting windings which are adapted to provide increased starting torque, but are not designed for operation over an extended period since they are subject to overheating. If attempts are made to start up compressors driven by such electric motors without relieving the compression during starting, such motors either draw a very heavy current in the regular operating windings or the starting windings continue to draw current for an undesirably long period. In either case damage to the motor is likely to result and in some cases, if operating speeds are not obtained rather quickly, there is danger of burning out the motor.

Electric motors differ in their characteristics but in practically all cases it is objectionable to subject them to heavy starting currents for an extended period of time. It is therefore desirable to relieve pressure at the compressor during the starting period, and even if a compressor is driven by other means, it may be desirable to unload it during starting.

In the past, resort has been made to various devices and arrangements for unloading fluid compressors during starting. Some of these have been manually controlled, and others have been automatically controlled in various ways. However, unloading devices which have been in use in the past have been open to certain objections. The attention required for manually operable unloaders is objectionable, and some of the automatic types have been unreliable in operation. In other cases, unloading devices have been complex in design and have been unsatisfactory in certain respects because of the numerous mechanical elements involved which are costly and require considerable maintenance.

Accordingly, it is an object of my invention to unload a fluid pump or compressor by simple positively acting automatic means.

A further object is to unload a fluid pump or compressor by automatic means which are controlled by the electric starting current of a drive motor, such means being rendered inoperative after the motor has obtained a satisfactory operating speed.

2

Another object is to unload a compressor by means of a solenoid operated valve, the solenoid being responsive to the electric current flowing through the windings of a driving motor.

Still another object is to combine an unloader for a compressor or the like, with a means for draining condensed moisture from a reservoir for compressed fluid, such as air, and to accomplish both under automatic control.

Other and further objects of the present invention will be apparent from the following description and claims and are illustrated in the accompanying drawing which, by way of illustration, shows a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

The single figure illustrates my improved automatic unloading mechanism, certain parts being shown diagramatically.

In the mechanism shown in the drawings a compressed fluid, for example, compressed air, is supplied by a suitable pump or compressor of any desired type which is not shown, but which may be driven by suitable connection from an electric motor 100. Fluid from the compressor passes to a pipe 11 leading to a T connection 12 which is connected to a pressure tank or storage tank 13, as by means of the nipple 14. If desired, the compressed air or other fluid may be passed from the compressor through a suitable after-cooler, not shown, before entering the pipe 11 in order that excessive heat imparted to the fluid by the compressor or pump may be removed, as is well known in the art. In such cases, the pipe or tube 11 connects to the aftercooler and conducts compressed fluid to the tank or reservoir 13.

The T connection 12, which may also include a check valve mentioned hereinafter, receives a connector 15 which, as shown, may be an elbow integral with, or connected by a suitable packing nut to a tube 16 which leads to another connector 17 at the unloader valve mechanism indicated generally at 20. The connector 17 may be an elbow member provided with a packing nut 18 to hold the upper end of the tube 16 in fluid tight connection with the elbow.

The unloader valve mechanism comprises a main casing member 21 which is provided with a suitable internally threaded opening 22 to receive the externally threaded portion 23 of the connector 17. The opening 22 leads to a valve chamber inside the casing member 21, said chamber leading upwardly to a valve seat element 25. The valve seat 25 is carried by an upper valve casing member 26 which has a depending threaded flange or shank 27 fitting into an internally threaded recess 28 which constitutes an enlarged portion of the valve chamber 24. A suitable sealing gasket 29 serves to maintain a fluid tight connection between the upper casing member 26 and the member 21.

The valve seat 25 is formed of a suitable material, for example, brass, bronze, or plastic impregnated composition, and is secured firmly in a transverse plate or head member 31 which is integral with and forms a part of the upper casing member 26, being part of the flange or shank 27 depending from the element 31. The seat 25 is located centrally of the member 31 which also constitutes the upper end or head of the valve chamber 24. This seat is provided with a central aperture or valve port 32 and a valve stem 33 passes through such port with sufficient clearance to permit the free flow of air or other compressed fluid around the valve stem when the valve is open. A valve closing disk 34 of suitable material is carried by the stem 33 and has an upper conical surface 35 which fits into the valve or seat opening 32 and serves to close the valve tightly when the valve stem 33 is in its normal raised position.

The upper valve casing member 26 includes a passage 37 above the head or plate 31 which communicates with a passage 38 extending downwardly in the casing member 21. These passageways lead to an outlet port 41 in the lower part of the casing 21 and a connector 42 secures a tube 43 to the port 41.

When the valve disk 34 is moved downwardly away from the seat element 25, compressed air or other fluid flows through the tube 11, through the T 12 and tube 16 into the connector 17, and then through valve chamber 24 and the valve port 32 into passages 37 and 38 to the outlet port 41 and out through the tube 43. Where atmosphere air is being compressed, the tube 43 may discharge to the atmosphere. If the unloader is used in connection with a pump or compressor operating on fluid which is not to be discharged, the tube 43 may lead to the low or intake side of the pump or compressor; the unloader in this case serves as a by-pass.

The valve disk 34 is normally held in closed position with respect to the valve seat 25 by the pressure of fluid in the valve chamber 24. Means next to be described are provided for opening the valve during starting operations and for permitting it to be closed after proper operating speeds have been reached.

The means for operating the valve 34 are mounted on top of the upper casing member 26 and comprise a hollow stud 44 which is threaded into an opening 45 in the top of casing 26. The valve stem 33 passes upwardly through the opening in the stud. The stud 44 is provided with an enlarged cylindrical head portion 46 to which is secured a vertically disposed cylindrical sleeve 47 about which an electrical coil 48 is wound to serve as a solenoid for operating the valve. As will be described more fully hereinafter, this coil is connected in series with the windings of the electric motor 100 so as to be energized when heavy starting current flows through such windings. A pair of openings 49 are provided in the head 46 to accommodate a spanner type wrench for tightening the stud into the opening 45 or for removing it therefrom.

The upwardly extending valve stem 33 fits smoothly within the hollow stud 44, being sufficiently tight to prevent substantial leakage. If desired however, the sleeve 47 may be tightly secured to the stud 44 and may be formed at its upper ends so as to be fluid tight so that, even though fluid leaks past the valve stem 33, it will not escape to the atmosphere. The upper end of the valve stem is preferably rounded as indicated at 50 and is adapted to be contacted by an element carried by the solenoid armature 51 which is drawn downwardly against the valve stem when the coil 48 is energized.

The armature 51 is normally disposed in a position somewhat above the coil 48, being retained in such position by an upwardly projecting stud 52 which is held in raised position by spring means to be described. This stud projects through transverse plates 53 and 54 which support an annular housing for the coil and other parts, indicated at 55. The lower plate 53 rests on, and is preferably secured to, the sleeve 47. The upper plate 54 is substantially co-extensive with plate 53 and is secured thereto by appropriate means which may include the bolt 56.

The armature stud 52 is surrounded by an inner coil spring 57 of relatively light construction and also by a heavier and larger coil spring 58 which surrounds the spring 57. A nut 59 is threaded onto the stud 52 and bears a depending annular projection 61 which serves to separate the springs 57 and 58 and maintain them in a spaced concentric relation. The spring 57 is preferably somewhat longer than the spring 58 so that in a fully raised position the nut 59 may be supported only by the light spring 57. However, the tension on both springs may be adjusted by varying the positions of the nut 59 on the stud. A lock nut is provided for holding the nut 59 in a desired position of adjustment.

As shown in the drawings, when the stud and associated parts are in the raised position, the heavy outer spring 58 preferably does not contact the nut 59 until the latter is lowered somewhat toward the plate 54. The reason for this construction is that when the solenoid 48 is energized, it applies somewhat less force to the armature 51 when the latter is in its fully raised position than when the armature is drawn further into the coil. Even during normal running conditions, the current to the motor 100 may fluctuate somewhat, causing minor fluctuations within the coil 48, and the light spring 57 serves to hold the armature 51 in a fully raised position and prevent vibration and chattering due to such variations in current. When heavy current flows through the solenoid 48 however, the solenoid is drawn forcibly downward, compressing both springs and driving the head 63 of the stud 52 into contact with the rounded upper end 50 of the valve stem 33. The armature thus forces the valve stem downwardly, bringing the valve disk 34 to a position shown in dotted lines substantially below the valve seat 25, and fully opening the valve. When this occurs, compressed air or other fluid may flow freely from the compressor through the valve and out through tube 43 in the manner previously described.

As mentioned above, the pressure in the valve chamber 24 is normally sufficient to close the valve 34 and hold it closed when the solenoid is de-energized and the armature 51 is drawn to its fully raised position by the springs 57 and 58. However, a spring may be provided for insuring the return of the valve to its closed position, such spring being applied to the valve 34 or valve stem 33 in any appropriate manner, not shown.

In addition to the means described above for relieving pressure at the compressor, it is desirable to provide means for draining condensed moisture and other liquid residue from the tank or reservoir 13 and this is readily accomplished in combination with the means described above. As is well known, considerable quantities of water are carried by the atmosphere and are condensed after compressed air has been permitted to cool. The reservoir 13 is preferably provided with a sump where condensed moisture may accumulate.

A pipe connection 71 which may be an elbow, is threaded into the tank 13 at the sump which is at the lowest part of the tank, and a tube 72 is threaded into the connection 71 and led upwardly to another connector 73 which may be provided with a suitable packing nut for attaching the tube 72 in a fluid tight connection. The connector 73 is threaded into an opening 74 in the bottom of a lower cap member 75 which is threaded as shown at 76 onto a depending flange or rim 77 of the main valve casing member 21 referred to above.

A valve seat member 78, formed of suitable material, is provided with a valve port or opening 79 and is mounted in a horizontal head or diaphragm 80 which is integral with, and forms the lower end of the casing member 21. A valve stem 81 extends upwardly through the opening 71 with sufficient clearance to permit the flow of water from the connection 71 through such opening. Valve stem 81 also extends through an opening 82 in the bottom wall portion 83 of the valve chamber 24 to a point where it may be contacted and forced downwardly by the valve disk 34. The parts are so arranged that when the valve disk 34 is moved to its lower position shown in dotted lines, the water relief valve 84, comprising a disk attached to the valve stem 81, is forced down to the dotted line position shown at the bottom of the valve structure. Since the tank or reservoir 13 contains compressed air or other fluid, the water is quickly forced out through the connection 71 and tube 72, and through the valve opening 79 which connects with the outlet port 41 mentioned above. Hence both the water from the bottom of the tank and the air or other fluid from the compressor are discharged through the same opening 41.

As in the case of the unloader valve, the water relief valve 84 is ordinarily held in its closed position by pressure in the valve chamber below the disk but, if desired, a suitable spring may be placed under the disk or around the valve stem to insure prompt closing of the valve disk after the armature 51 and associated parts have been drawn upwardly.

Ordinarily the time required for the driving motor 100 to attain normal operating speed is very short, of the order of one or two seconds, and during this period there is not sufficient loss of pressure from the storage tank through the connections 14, 15, and 16, or through the drain connections 71 and 72, to be objectionable. However, for some purposes, it may be desirable to provide check valves for preventing excessive loss of pressure in the storage tank during the time that the valves described above are open.

To prevent loss of pressure through the connections 14, 12, 15 and 16, a suitable check valve, indicated at 90, may be inserted in the T 12 or in connection therewith so that compressed air cannot flow out of the tank through these connections. The details of such a valve form no part of the present invention and need not be described, since many types of suitable check valves are known in the art. To prevent loss of pressure through the connection 71 after condensed moisture has all been blown out, a float controlled valve of any desired type may be provided, or any valve which is designed to permit the escape of moisture and to close after moisture has been released may be used. Ordinarily however, as indicated above, these valves are not required since the loss of pressure from the tank 13 during the short time period required for starting operations is not particularly objectionable.

The solenoid windings, as indicated above, are connected in series with the windings of the motor 100, one lead from the windings, as indicated at 91, being connected to one terminal at the motor 100. The other lead 92 connects to a switch 93 on one side of the electric power supply line. The other side of the line is connected, as indicated at 94, to the other pole of the electric motor 100. In motors having starting windings which draw heavy current, the solenoid 48 may be in series only with the starting windings which may be thrown out of operation when operating speed is attained. In other types of motors it may be desirable to have the windings of the solenoid 48 connected in series with the operating windings of the motor in which case current flows continuously through the solenoid. In the latter case the solenoid windings are preferably of low resistance and the armature, and the springs 57 and 58 which support it in raised position, are so designed and adjusted that the ordinary operating current for the motor does not draw the solenoid downwardly. During starting, when current to the motor is much heavier than during normal operations, the increased pull of the solenoid 48 on armature 51 is sufficient to open the valves in the manner hereinabove described, the springs 57 and 58 being properly chosen as to length and strength, and the nut 59 being suitably adjusted as described above.

While I have described my invention as being operated under the direct control of an electric motor which serves to drive the pump or compressor, it will be obvious that the pump or compressor might be driven by other suitable means in which case the flow of current to the solenoid may be controlled in any desired manner so as to open the valves when the compressor is moving slowly and to close them when it has reached normal operating speed. It will be understood that by the expression "normal operating speed" is meant any suitable speed above the starting speed where currents flowing in the motor are not objectionably high or wherever unloading of the compressor is no longer required.

While I have described the invention in connection with an air compressor, it will be obvious that it might be adapted to various other analogous uses.

Hence, while I have illustrated and described the preferred embodiments of my invention, it is to be understood that these are capable of variation and modification and I therefore do not wish to be limited to the precise details set forth, but desire to avail myself of such changes and alterations as fall within the purview of the following claims:

I claim:

1. For use with an electric motor driven air compressor system or the like wherein the starting current of the motor is greater than the normal operating current thereof, an unloader valve mechanism comprising a valve chamber, a conduit for leading the output of the compressor to said chamber, a valve in said chamber, a discharge conduit leading from said valve to the free atmosphere, a movable armature for opening said valve, said armature being separate from and normally spaced from said valve, an electromagnet responsive to starting current in said motor for moving said armature to one position to open said valve, and resilient means for moving said armature to another position away from said valve to permit said valve to close when the current flowing through said motor is less than said starting current.

2. The combination with an electric motor operated air compressor system including a reservoir having a sump, of a valve mechanism for withdrawing condensed moisture from said system, comprising a valve chamber, a conduit from said sump to said valve chamber, a valve in said chamber, means normally closing said valve, and electromagnetic means responsive to flow of starting current in the motor of said system for opening said valve momentarily during starting operations to permit discharge of said moisture from said sump.

3. The combination with an electric motor driven fluid compressor wherein the starting current flowing in the operating circuit of said motor is greater than the normal operating current therein, of a valve casing, a valve for unloading such a compressor, a solenoid mounted on said valve casing, said solenoid comprising an elongated armature mounted in axial alignment with said valve and movable into one position to open said valve and into another position to permit said valve to close, the solenoid being separate from and normally spaced from said valve, and windings positioned about said armature and adapted to be connected in series to such an operating circuit of said motor, and resilient means connected to said armature and urging said armature toward said other position, said solenoid being responsive to starting current in said circuit for moving said armature to said one position, said resilient means being operable to move said armature to said other position when the current in said circuit is less than said starting current and means for normally closing said valve.

4. The combination with an electric motor driven fluid compressor system wherein the starting current flowing in the operating circuit of the motor is greater than the normal operating current therein, of a valve for unloading the compressor, said valve including a valve member movable into a compressor-loading position and into a compressor-unloading position, means for moving said valve member into said loading and unloading positions, said means including a solenoid having an armature mounted in axial alignment with said valve member and movable into and out of operative engagement with said valve member, and an electrical coil positioned around said armature and operatively connected in series with said circuit, said coil being responsive to said starting current in said circuit to move said armature into said operative engagement with said valve member to thereby move said valve member into said unloading position, and a resilient member connected to said armature and operable to move said armature out of said operative engagement with said valve member when the current in said circuit is less than said starting current, to thereby free said valve member for movement into said loading position.

5. A combination as defined in claim 4 and which includes, a sump operatively connected to the said compressor for collecting condensate from fluid compressed by the compressor, a drain valve operatively connected to said sump and operable to be opened and closed to thereby open and close said sump to the atmosphere, said drain valve including a valve member reciprocably mounted in said drain valve for opening and closing the latter, said last named valve member being movable into one position to open said drain valve and movable into another position to close said drain valve, and means for moving said last mentioned valve member into said positions, said last named means including said first named valve member, said first named valve member being mounted adjacent to said last named valve member and being operable upon movement into said unloading position to engage said last named valve member and move the latter into said one position.

6. The combination with an electric motor operated air compressor system including a reservoir, and wherein the starting current in the operating circuit of said motor is greater than the normal operating current therein, of a compressor unloading valve, a condensate drain conduit extending from said reservoir, a valve controlling said conduit, means normally closing both valves and operating means for opening the valves including a solenoid in circuit with the motor, an armature for the solenoid, said solenoid being responsive to the starting current in the motor to move said armature to move said unloading valve to open position and the movement of said unloading valve moving said second valve to open position so that the condensate can drain while the unloading valve is open.

7. A combination as defined in and by claim 6 wherein a casing supports said two valves and has separate valve chambers therein, one for each valve, and wherein said casing is connected in fluid circuit directly with said reservoir and wherein a second casing is mounted on said first casing and houses the valve operating means.

8. The combination with an electric motor operated air compressor system including a reservoir, and wherein the starting current in the operating circuit of said motor is greater than the normal operating current therein, of means to unload the compressor and to permit condensate discharge from the reservoir comprising a casing mounted on the reservoir and having a first chamber therein, a conduit extending from the reservoir and communicating with the said chamber, the said chamber having aligned openings in two opposite walls thereof, a valve within the chamber, a stem for said valve projecting through one of the openings in the chamber, said casing having a second chamber therein having aligned openings in opposite walls in alignment with the first mentioned openings, a second conduit extending from said reservoir and communicating with one opening in said second chamber, a second valve in said second chamber, a stem for said second valve projecting through the other opening in said second chamber and extending through the said other opening in the first chamber and terminating within said first chamber in alignment with said first valve, operating means for said first valve including an electro-magnet in circuit with the motor and an armature in alignment with said first valve stem, resilient means holding said armature in spaced relation to said first valve stem, means normally closing both valves, said casing having discharge conduits communicating respectively between both said chambers and the atmosphere, said conduits having a common outlet, the said valve controlling fluid flow through said discharge conduits, and said electro-magnet being responsive to the starting current in said motor to move said armature to open said first valve to unload the compressor, the movement of said first valve opening said second valve to permit discharge of condensate.

9. The combination with an electric motor driven air compressor system including a reservoir having a sump, and wherein the starting current of the motor is greater than the normal operating current thereof, of an unloader valve mechanism comprising a valve chamber, a conduit for leading the output of the compressor to said chamber, a relief valve in said chamber, a discharge conduit leading from said relief valve to the free atmosphere, a movable armature for opening said valve, an electromagnet responsive to starting current in the motor for moving the armature to open said relief valve, means for moving the armature to another position to permit said relief valve to close when the current in the motor is less than said starting current, and a valve mechanism for withdrawing condensed moisture from said system, comprising a valve chamber, a conduit from said sump to said last mentioned valve chamber, a valve in said last mentioned chamber, means normally closing said last mentioned valve, said last mentioned valve being movable to open position by the opening movement of said relief valve.

WILLIAM P. DALRYMPLE.

REFERENCES CITED

The following references are of record in the file of this patent:

UNITED STATES PATENTS

| Number | Name | Date |
|---|---|---|
| 669,640 | Hewlett | Mar. 12, 1901 |
| 1,912,463 | Ploeger | June 6, 1933 |
| 2,062,052 | Horlacher | Nov. 24, 1936 |
| 2,083,740 | Paullin | June 15, 1937 |
| 2,118,403 | Hewitt | May 24, 1938 |
| 2,128,206 | Hewitt | Aug. 23, 1938 |